United States Patent
Kohita et al.

(10) Patent No.: US 11,308,274 B2
(45) Date of Patent: Apr. 19, 2022

(54) WORD GROUPING USING A PLURALITY OF MODELS

(71) Applicant: INTERNATIONAL BUSINESS MACHINES CORPORATION, Armonk, NY (US)

(72) Inventors: Ryosuke Kohita, Tokyo (JP); Issei Yoshida, Tokyo (JP); Tetsuya Nasukawa, Kanagawa-ken (JP); Hiroshi Kanayama, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 16/415,576

(22) Filed: May 17, 2019

(65) Prior Publication Data
US 2020/0364298 A1    Nov. 19, 2020

(51) Int. Cl.
*G06F 40/205* (2020.01)
*G06F 17/15* (2006.01)
*G06F 40/284* (2020.01)

(52) U.S. Cl.
CPC ............ *G06F 40/205* (2020.01); *G06F 17/15* (2013.01); *G06F 40/284* (2020.01)

(58) Field of Classification Search
CPC . G06F 40/00–58; G06F 16/3344; G06F 17/15
USPC ............................ 704/1, 9, 10, 257, 270–275
See application file for complete search history.

(56) References Cited

U.S. PATENT DOCUMENTS

| | | | |
|---|---|---|---|
| 9,169,467 B2 | 10/2015 | Govindarajan et al. | |
| 9,229,924 B2 | 1/2016 | Sun et al. | |
| 9,275,044 B2 * | 3/2016 | Lund | G06F 40/247 |
| 9,280,536 B2 * | 3/2016 | Sayers | G06F 40/279 |
| 9,311,297 B2 * | 4/2016 | Bhatnagar | G06F 40/237 |
| 9,400,778 B2 * | 7/2016 | Ramani | G06F 40/268 |
| 2011/0251839 A1 * | 10/2011 | Achtermann | G06F 40/40 |
| | | | 704/9 |

(Continued)

OTHER PUBLICATIONS

Godbole et al. "Building Re-usable Dictionary Repositories for Real-world Text Mining". CIKM'10, Oct. 26-30, 2010, Toronto, Ontario, Canada, pp. 1189-1198 (Year: 2010).*

(Continued)

*Primary Examiner* — Jesse S Pullias
(74) *Attorney, Agent, or Firm* — Tutunjian & Bitetto, P.C.; Randall Bluestone

(57) ABSTRACT

A computer-implemented method is provided. The method includes acquiring a seed word; calculating a similarity score of each of a plurality of words relative to the seed word for each of a plurality of models to calculate a weighted sum of similarity scores for each of the plurality of words; outputting a plurality of candidate words among the plurality of words; acquiring annotations indicating at least one of preferred words and non-preferred words among the plurality of the candidate words; updating weights of the plurality of models in a manner to cause weighted sums of similarity scores for the preferred words to be relatively larger than the weighted sums of the similarity scores for the non-preferred words, based on the annotations; and grouping the plurality of candidate words output based on the weighted sum of similarity scores calculated with updated weights of the plurality of models.

16 Claims, 4 Drawing Sheets

(56) References Cited

U.S. PATENT DOCUMENTS

2016/0188564 A1* 6/2016 Lobez Comeras ... G06F 16/367
704/9
2018/0173696 A1 6/2018 Hosabettu

OTHER PUBLICATIONS

Cruz, Laura, et al. "Dictionary-Based Sentiment Analysis applied to specific domain using a Web Mining approach," CEUR Workshop Proceedings, pp. 80-88, Sep. 2016, vol. 1743. No. 1.
Grace Period, Kohita, Ryosuke, et al., "Interactive Construction of Domain and User Oriented Dictionary," Annual meeting of the Association for Natural Language Processing, Mar. 2019, pp. 1273-1276, vol. 25 (NLP2019).

* cited by examiner

WORD GROUPING USING A PLURALITY OF MODELS

STATEMENT REGARDING PRIOR DISCLOSURES BY THE INVENTOR OR A JOINT INVENTOR

The following disclosure(s) are submitted under 35 U.S.C. § 102(b)(1)(A):

DISCLOSURE(S): [Interactive Construction of Domain and User Oriented Dictionary, Annual meeting of the Association for Natural Language Processing Vol. 25 (NLP2019), 4 Mar. 2019, Ryosuke Kohita, Tetsuya Nasukawa, Issei Yoshida, Hiroshi Kanayama, p.1273-p.1276].

BACKGROUND

The present invention relates to word grouping, and more specifically to word grouping using a plurality of models.

Conventionally, in the field of creating a word dictionary, features are extracted using, for example, n-gram and Word2Vec to group words with similar features.

SUMMARY

According to an embodiment of the present invention, a computer-implemented method is provided that includes acquiring a seed word; calculating a similarity score of each of a plurality of words relative to the seed word for each of a plurality of models to calculate a weighted sum of similarity scores for each of the plurality of words; outputting a plurality of candidate words among the plurality of words; acquiring annotations indicating at least one of preferred words and non-preferred words among the plurality of the candidate words; updating weights of the plurality of models in a manner to cause weighted sums of similarity scores for the preferred words to be relatively larger than the weighted sums of the similarity scores for the non-preferred words, based on the annotations; and grouping the plurality of candidate words output based on the weighted sum of similarity scores calculated with updated weights of the plurality of models. In this way, it is possible to accurately judge the similarity between words.

According to another embodiment of the present invention, an apparatus is provided that includes a processor or a programmable circuitry; and one or more computer readable mediums collectively including instructions that, in response to being executed by the processor or the programmable circuitry, cause the processor or the programmable circuitry to acquire a seed word; calculate a similarity score of each of a plurality of words relative to the seed word for each of a plurality of models to calculate a weighted sum of similarity scores for each of the plurality of words; output a plurality of candidate words among the plurality of words; acquire annotations indicating at least one of preferred words and non-preferred words among the plurality of the candidate words; update weights of the plurality of models in a manner to cause weighted sums of similarity scores for the preferred words to be relatively larger than the weighted sums of the similarity scores for the non-preferred words, based on the annotations; and group the plurality of candidate words output based on the weighted sum of similarity scores calculated with updated weights of the plurality of models. In this way, it is possible to accurately judge the similarity between words.

According to another embodiment of the present invention, a computer program product is provided that has one or more computer readable storage mediums collectively storing program instructions that are executable by a processor or programmable circuitry to cause the processor or the programmable circuitry to perform operations including acquiring a seed word; calculating a similarity score of each of a plurality of words relative to the seed word for each of a plurality of models to calculate a weighted sum of similarity scores for each of the plurality of words; outputting a plurality of candidate words among the plurality of words; acquiring annotations indicating at least one of preferred words and non-preferred words among the plurality of the candidate words; updating weights of the plurality of models in a manner to cause weighted sums of similarity scores for the preferred words to be relatively larger than the weighted sums of the similarity scores for the non-preferred words, based on the annotations; and group the plurality of candidate words output based on the weighted sum of similarity scores calculated with updated weights of the plurality of models. In this way, it is possible to accurately judge the similarity between words.

The summary clause does not necessarily describe all necessary features of the embodiments of the present invention. The present invention can also be a sub-combination of the features described above. The above and other features and advantages of the present invention will become more apparent from the following description of the embodiments taken in conjunction with the accompanying drawings.

BRIEF DESCRIPTION OF THE DRAWINGS

The following description will provide details of preferred embodiments with reference to the following figures wherein.

DETAILED DESCRIPTION

Hereinafter, some embodiments of the present invention will be described. The embodiments do not limit the invention according to the claims, and all the combinations of the features described in the embodiments are not necessarily essential to means provided by aspects of the invention.

Figure 1:
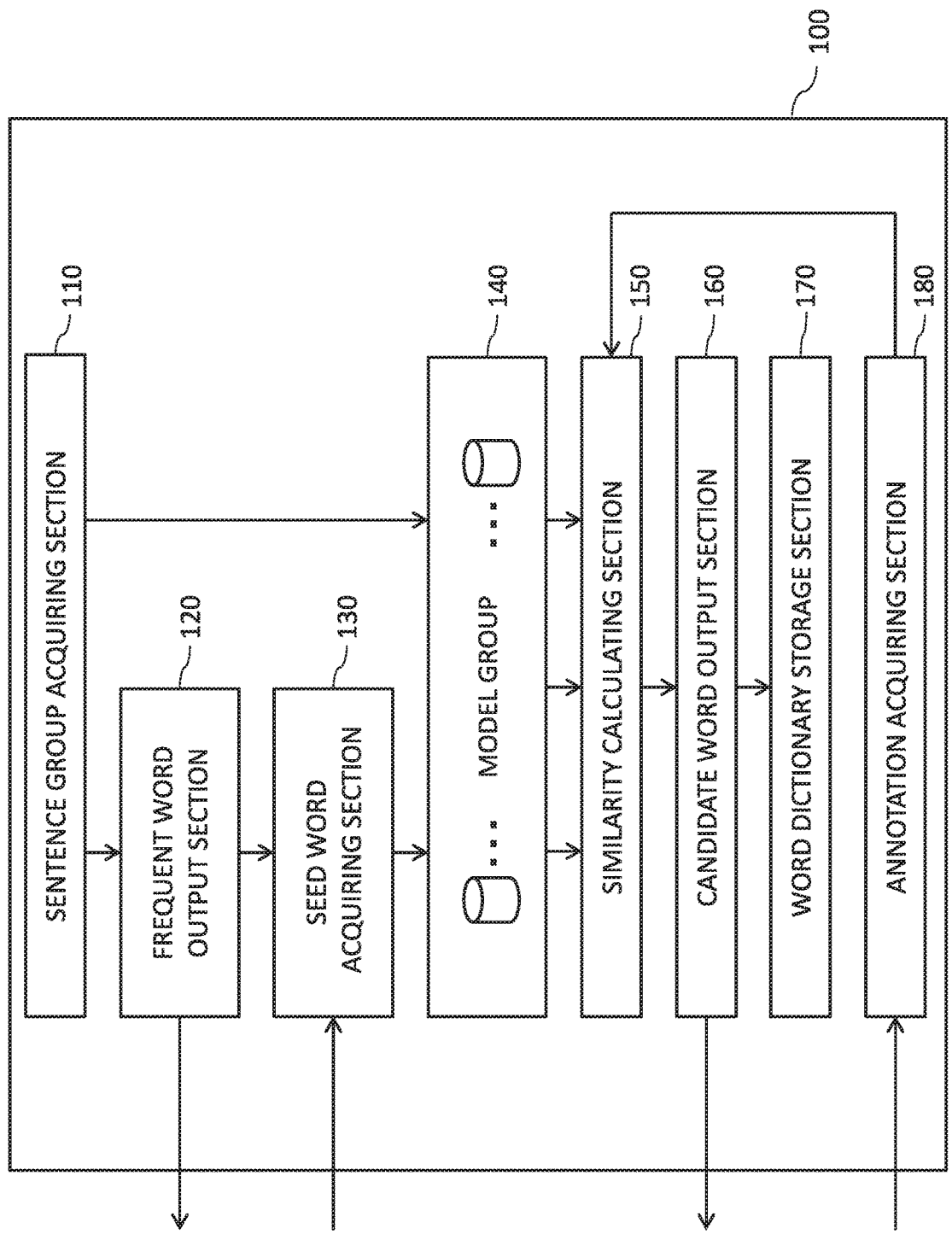
FIG. 1 shows an example of a block diagram of a apparatus 100 according to the present embodiment.

FIG. 1 shows an example of a block diagram of an apparatus 100 according to the present embodiment. The apparatus 100 can be a computer such as a PC (Personal Computer), a tablet computer, a smartphone, a work station, a server computer, or a general purpose computer, or can be a computer system in which a plurality of computers are connected. Such a computer system is also a computer, in a broad definition. Furthermore, the apparatus 100 can be implemented by one or more virtual computer environments capable of being executed in a computer. Alternatively, the apparatus 100 can be a specialized computer designed to group words, or can be specialized hardware realized by specialized circuitry. Furthermore, if the apparatus 100 is capable of connecting to the Internet, the apparatus 100 can be realized by cloud computing.

The apparatus 100 judges the similarity between words by performing a data analysis using a plurality of models on a sentence group, using text mining, for example, and provides a user with a plurality of words having similar natures as candidate words. The apparatus 100 then creates a word dictionary by grouping together a plurality of words that align with the intent of the user, based on user feedback. At this time, the apparatus 100, according to the present embodiment, consecutively learns weights of the plurality of models, based on annotations indicating at least one of preferred words and non-preferred words among the plurality of candidate words.

The apparatus 100 includes a sentence acquiring section 110, a frequent word output section 120, a seed word acquiring section 130, a model group 140, a similarity calculating section 150, a candidate word output section 160, a word dictionary storage section 170, and an annotation acquiring section 180.

The sentence acquiring section 110 acquires the sentence group to which the data analysis is to be applied. As an example, the sentence acquiring section 110 acquires a plurality of sentences from data accumulated in a server, the Internet, or the like as the sentence group. At this time, the sentence acquiring section 110 can acquire a plurality of sentences associated with a common domain as one sentence group. The sentence acquiring section 110 supplies the acquired sentence group to the frequent word output section 120 and the model group 140.

The frequent word output section 120 extracts and outputs, as frequent words, a plurality of words with high appearance frequencies from among the words in the sentence group supplied from the sentence acquiring section 110. The frequent word output section 120 supplies the extracted plurality of frequent words to a user device, via a network, for example. Furthermore, the frequent word output section 120 can supply the plurality of extracted frequent words to the seed word acquiring section 130.

The seed word acquiring section 130 acquires a seed word that becomes a seed for judging the similarity between words. As an example, the seed word acquiring section 130 acquires a seed word selected by the user from among the plurality of frequent words from the user device, via the network. However, the present embodiment is not limited to this. The seed word acquiring section 130 can acquire any seed word selected by the user from among words that are different from the plurality of frequent words, can acquire the seed word from another apparatus or another function section separate from the user device, or can acquire a seed word that is not a word selected by the user. For example, the seed word acquiring section 130 can automatically extract and acquire, as a seed word, any word selected from among the plurality of frequent words supplied from the frequent word output section 120. The seed word acquiring section 130 supplies the acquired seed word to the model group 140.

The model group 140 includes a plurality of models extracting different feature quantities. Here, feature quantities refer to measurable properties of an object that is to be analyzed. In the present embodiment, the plurality of models can be models selected from among n-gram, Word2Vec, Skip-Gram, head-dependency, dep-dependency, and the like, for example. The model group 140 inputs the plurality of sentences supplied from the sentence acquiring section 110 to each of the plurality of models and, for the seed word and each of the plurality of words in the sentence group, outputs a plurality of results having different feature quantities. At this time, as an example, each of the plurality of models receives a plurality of sentences and, for a specified word in the plurality of sentences, outputs a feature quantity vector indicating what kind of character sequence has what kind of relationship to the specified word, the probability with which these words co-occur, and the like. The model group 140 supplies the similarity calculating section 150 with the output of the plurality of models extracting different feature quantities, for each word.

The similarity calculating section 150 calculates the similarity of each of the plurality of words in the sentence group with respect to the seed word. In this case, for each of the plurality of words, the similarity calculating section 150 calculates a similarity score with respect to the seed word for each of the plurality of models, based on the output of each of the plurality of models extracting different feature quantities, and calculates a weighted sum of these similarity scores. Furthermore, the similarity calculating section 150 of the apparatus 100 according to the present embodiment calculates a weighted sum of the similarity scores for which the weights of the plurality of models have been updated. This is described in detail further below. The similarity calculating section 150 supplies the candidate word output section 160 with the weighted sum of the similarity scores calculated for each of the plurality of words.

The candidate word output section 160 outputs a plurality of candidate words to be compared to the seed word. As an example, the candidate word output section 160 outputs, as the candidate words, a plurality of words whose weighted sums of the similarity scores are high, among the words in the sentence group supplied from the sentence acquiring section 110. The candidate word output section 160 supplies the extracted plurality of candidate words to the user device, via the network, for example. In other words, the candidate word output section 160 provides the user with a plurality of words with features similar to the seed word, as the candidate words. Furthermore, the candidate word output section 160 supplies the word dictionary storage section 170 with the plurality of extracted candidate words.

The word dictionary storage section 170 creates a word dictionary by grouping the plurality of candidate words supplied from the candidate word output section 160 into the same group as the seed word, and stores this word dictionary. At this time, the apparatus 100 according to the present embodiment groups together a plurality of words that align with the intent of the user, based on user feedback.

The annotation acquiring section 180 acquires annotations indicating at least one of preferred words and non-preferred words among the plurality of candidate words. As an example, the annotation acquiring section 180 acquires annotations, from the user device via the network, that indicate which words among the plurality of candidate words have been selected as preferred words by the user and which words among the plurality of candidate words have been selected as non-preferred words by the user. Thus, in an embodiment of the present invention, candidate words can be annotated as preferred words or non-preferred words based on user feedback. In the above description, an example is shown in which the annotation acquiring section 180 acquires annotations for both the preferred words and the non-preferred words among the candidate words, but the present embodiment is not limited to this. The annotation acquiring section 180 can acquire annotations for only the preferred words among the candidate words, or can acquire annotations for only the non-preferred words among the candidate words. Furthermore, in a case where annotations are acquired for only the preferred words, the annotation acquiring section 180 can treat the candidate words that are not indicated as preferred words among the plurality of candidate words as non-preferred words.

In some embodiments of the present invention, the preferred words and non-preferred words can be identified as such by a user via an interface provided on a computing device, such as a mobile smart phone or a tablet device. In other embodiments of the present invention, the preferred words and non-preferred words can be identified automatically by a computer system, such as a mobile device, a tablet device, and/or cloud-based servers, based on historical user activity (e.g., words used by user in text messages, web search terms and results, etc.) monitored by the computer system and processed by trained machine-learning models.

In some embodiments of the present invention, a combination of user selection and machine learning is used, such that the user can initially identify a limited set of preferred and non-preferred words, and the trained machine learning model can further expand and refine the set of preferred words and non-preferred words based on the user-identified limited set. Alternatively, the initial selection and identification can be performed by the trained machine learning model, with the user provided with an interface to override and/or add to the word dictionary. These user-provided changes can then be used by the trained machine learning model to further refine the word dictionary.

The apparatus 100 according to the present embodiment then feeds back the annotations acquired by the annotation acquiring section 180, and updates the weights of the plurality of models used when the similarity calculating section 150 calculates the weighted sums of the similarity scores. This is described in detail using a flow.

Figure 2:
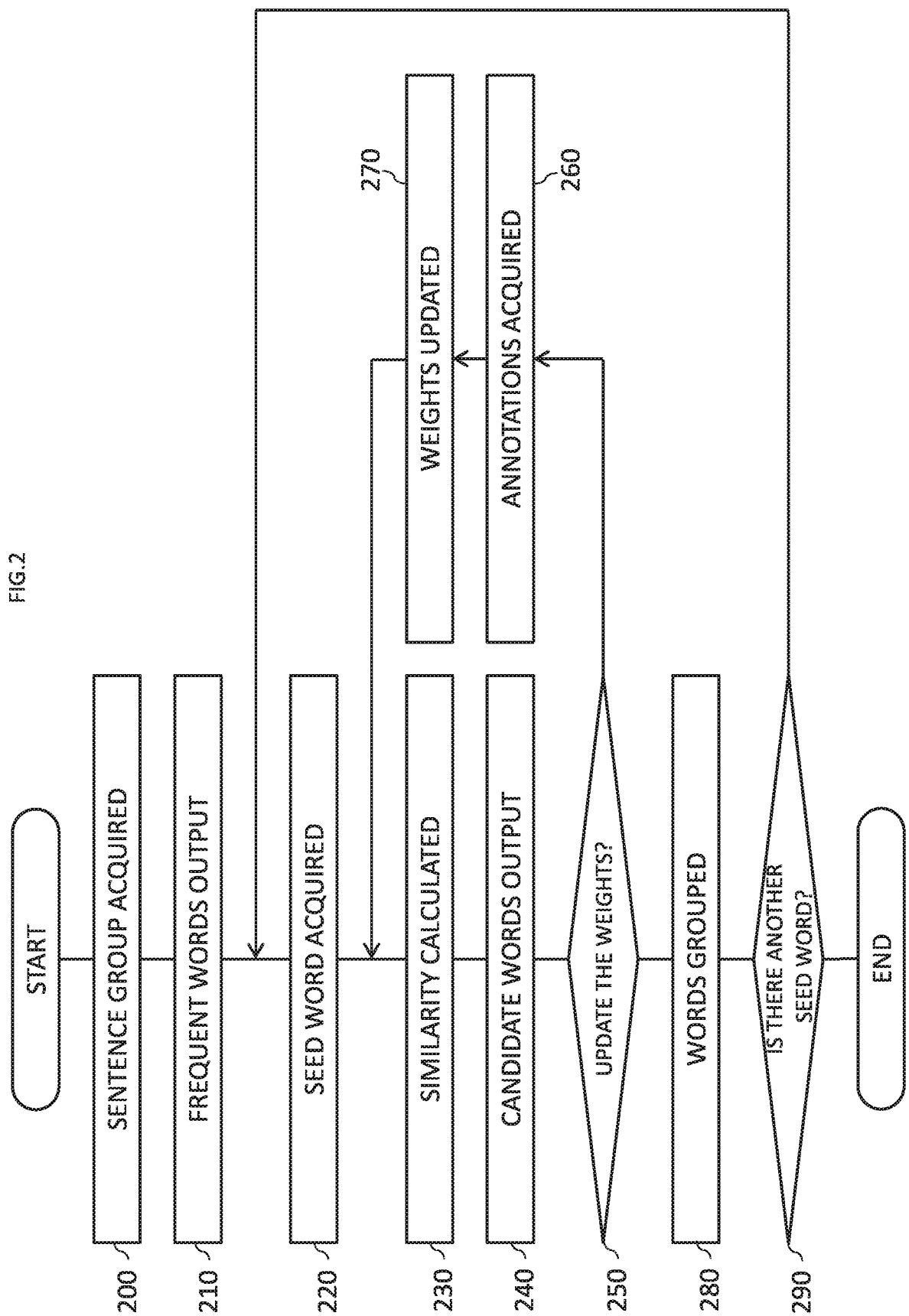
FIG. 2 shows a process flow of the apparatus 100 according to the present embodiment.

FIG. 2 shows a process flow of the apparatus 100 according to the present embodiment. This flow describes an example in which the apparatus 100 creates a word dictionary of "healthy foods" from a plurality of sentences relating to healthy foods. At step 200, the apparatus 100 acquires the sentence group. For example, the sentence acquiring section 110 acquires a plurality of sentences concerning "healthy foods" as the plurality of sentences relating to a common domain, from data accumulated in a server, the Internet, or the like.

At step 210, the apparatus 100 outputs the frequent words. For example, the frequent word output section 120 extracts a plurality of words having appearance frequencies that are relatively high or that are higher than a predetermined threshold value, from among the words in the sentence group acquired at step 200, and outputs these words as the frequent words. As an example, the frequent word output section 120 extracts and outputs "eat, yogurt, soybeans, breakfast, almond, diet, milk, calorie, drink" as the frequent words. The frequent word output section 120 supplies the plurality of extracted frequent words to the user device, via the network. Instead of or in addition to this, the frequent word output section 120 can supply the plurality of extracted frequent words to the seed word acquiring section 130. Furthermore, the frequent word output section 120 can output the plurality of frequent words together with additional information such as the appearance frequency.

At step 220, the apparatus 100 acquires the seed word. For example, the seed word acquiring section 130 acquires a seed word selected by the user from among the plurality of frequent words provided to the user at step 210, from the user device via the network. As an example, the user who wants to create the word dictionary of "healthy foods" selects "yogurt", which is a "healthy food", from among a plurality of candidate words. The seed word acquiring section 130 then acquires "yogurt" as the seed word from the user device via the network. Instead of or in addition to this, the seed word acquiring section 130 can automatically extract any selected word (e.g., the word with the highest appearance frequency) from among the plurality of frequent words supplied from the frequent word output section 120 at step 210, as the seed word.

At step 230, the apparatus 100 calculates the similarity between the words. First, the apparatus 100 inputs the plurality of sentences acquired at step 200 to each of the plurality of models, and outputs a plurality of results having different feature quantities, for the seed word and each of the plurality of words in the sentence group.

As an example, each of the plurality of models receives a plurality of sentences and, for a specified word in the plurality of sentences, outputs a feature quantity vector indicating what kind of character sequence has what kind of relationship to the specified word, the probability with which these words co-occur, and the like. As an example, in the case where a plurality of sentences concerning "healthy foods" are input, one model among the plurality of models can output a feature quantity vector for the word "almond" indicating what kind of character sequences have what degree of co-occurrence within n letters before and after the word "almond", for example. Furthermore, one other model among the plurality of models can output a feature quantity vector for the word "almond" indicating what kind of character sequences have what degree of co-occurrence with the word "almond" according to what grammatical relationship, for example. In this way, the plurality of models possessed by the model group 140 can each extract a different feature quantity, and can be a plurality of models selected from among n-ram, Word2Vec, Skip-Gram, head-dependency, dep-dependency, and the like, for example. Furthermore, one model among the plurality of models can be a learning model such as a neural network, in which case the apparatus 100 can update and learn parameters of the models by adding weights to each of the plurality of models, based on the annotations.

The similarity calculating section 150 then, for each of the plurality of words in the sentence group, calculates the similarity score of this word relative to the seed word for each of the plurality of models extracting different feature quantities, and calculates the weighted sum of the similarity scores. Here, calculating the weighted sum of the similarity scores can include using the weighted average of cosine similarities of the plurality of models. Furthermore, the weighted average of the cosine similarities can be calculated using a function that is normalized such that the total weight of the plurality of models is a constant value. This is described using mathematical expressions.

The similarity calculating section 150 acquires the feature quantity vector of the seed word and the feature quantity vector of each of the plurality of words in the sentence group, based on the output of each of the plurality of models extracting different feature quantities. Next, for each of the plurality of words in the sentence group, the similarity calculating section 150 calculates the similarity score of this word with respect to the seed word, for each of the plurality of models extracting different feature quantities, according to the cosine similarities between the respective feature amount vectors. Then, for each of the plurality of words in the sentence group, the similarity calculating section 150 calculates the weighted sum of the similarity scores using the weighted average of the cosine similarities, according to the expression shown below. Here, s is the seed word, w is the word being compared to the seed word, W is the weight, M is the model group, |M| is the number of models, $W_m$ is the weight of the model m, and $\text{Cosine}_m$ is the cosine similarity resulting from the model m. Furthermore, Z is a normalization function, which normalizes the total weight $W_m$ of each of the plurality of models to be 1.

$$\text{Score}(s, w, W) = \frac{\sum_{m}^{M} W_m \times Z(\text{Cosine}_m(s, w))}{|M|}, \quad \text{Expression 1}$$

$$\text{such that} \sum W = 1$$

At step 240, the apparatus 100 outputs the plurality of candidate words to be compared to the seed word. For example, the candidate word output section 160 extracts a plurality of words for which the weighted sums of the similarity scores calculated at step 230 are high, from among the words in the sentence group, as the candidate words. As an example, the candidate word output section 160 extracts "drink, eat, breakfast, milk, lactobacillus, soybeans, almond,  Incorporated) as the plurality of candidate words to be compared to the word "yogurt" serving as the seed word. The candidate word output section 160 then supplies the plurality of extracted candidate words to the user apparatus via the network, for example. Furthermore, the candidate word output section 160 supplies the plurality of extracted candidate words to the word dictionary storage section 170. The candidate word output section 160 can output the plurality of candidate words together with additional information such as the similarity thereof with respect to the seed word. Furthermore, the candidate word output section 160 can output the plurality of candidate words in order of the magnitude of the weighted sums of the similarity scores thereof. In this way, by having the candidate word output section 160 provide the user with the words in order from the word with the highest score, the apparatus 100** can actively receive the annotations for words with high scores and make the learning more efficient.

At step 250, the apparatus 100 judges whether it is necessary to update the weights for each of the plurality of models. The apparatus 100 can judge the necessity of the weight update based on user input, based on the number of times the weights have been updated, based on the time needed to perform the process of updating the weights, or based on another standard.

If it is judged at step 250 that it is necessary to update the weights, the apparatus 100, at step 260, acquires the annotations indicating at least one of preferred words and non-preferred words among the plurality of candidate words. For example, the annotation acquiring section 180 acquires annotations, from the user device via the network, that indicate which words among the plurality of candidate words have been selected as preferred words by the user and which words among the plurality of candidate words have been selected as non-preferred words by the user. As an example, the annotation acquiring section 180 acquires annotations indicating that, among the plurality of candidate words, "soybeans, almond, milk" have been selected by the user as preferred words and "eat, breakfast, lactobacillus,  Incorporated, drink" have been selected by the user as non-preferred words. Alternatively, the annotation acquiring section 180 can acquire annotations for only the preferred words among the plurality of candidate words. In this case, the annotation acquiring section 180 can treat the candidate words that are not indicated as preferred words, among the plurality of candidate words, as non-preferred words. Alternatively, the annotation acquiring section 180 can acquire annotations for only the non-preferred words among the plurality of candidate words. In this case, the annotation acquiring section 180 can treat the candidate words that are not indicated as non-preferred words, among the plurality of candidate words, as preferred words. In this way, the apparatus 100** can shorten the time needed for the user to input the annotations.

At step 270, the apparatus 100 updates the weights of the plurality of models such that the weighted sums of the similarity scores for the preferred words become relativity larger than the weighted sums of the similarity scores for the non-preferred words, based on the annotations acquired at step 260. At this time, the apparatus 100 can update the weights of the plurality of models in a manner to increase the smallest weighted sum of the similarity scores, among the weighted sums of the similarity scores of the plurality of preferred words. Alternatively, the apparatus 100 can update the weights of the plurality of models in a manner to decrease a randomly selected weighted sum of the similarity scores, among the weighted sums of the similarity scores of the plurality of non-preferred words. This is described using mathematical expressions.

The apparatus 100 updates the weights of the plurality of models in a manner to maximize the smallest weighted sum of the similarity scores, among the weighted sums of the similarity scores of the plurality of preferred words. At this time, the apparatus 100 optimizes the weights by performing an algorithm, shown by the expressions below, a predetermined number of times. Here, p is a preferred word, P is a preferred word group, and ε is a learning coefficient. In this way, the apparatus 100 can increase the weighted sums of the similarity scores of all of the preferred words.

$$p_{min} = \min\{\text{Score}(s, p, W); p \in P\} \quad \text{Expression 2}$$

$$W = W + \frac{dp_{min}}{dw} \times \varepsilon$$

Furthermore, in a case where the annotations of the non-preferred words are also acquired in addition to the annotations of the preferred words, the apparatus 100 updates the weights of the plurality of models in a manner to lower a randomly selected weighted sum of the similarity scores, among the weighted sums of the similarity scores of the plurality of non-preferred words. At this time, the apparatus 100 optimizes the weights by performing an algorithm, shown by the expression below, a predetermined number of times. Here, u is an non-preferred word, random( ) is a function for randomly selecting one word from a word group, and U is an non-preferred word group. Furthermore, a is an adjustment coefficient for adjusting how strongly the update of the weights based on the non-preferred words is reflected, compared to the update of the weights based on the preferred words. For example, in a case where the update of the weights based on the non-preferred words is to be weakly reflected, compared to the update of the weights based on the preferred words, a can be a number less than 1, e.g., approximately ½.

$$p_{min} = \min\{\text{Score}(s, p, W); p \in P\} \quad \text{Expression 3}$$

$$u_{ran} = \text{Score}(s, \text{random}(U), W)$$

-continued
$$W = W + \frac{dp_{min}}{dw} \times \varepsilon - \frac{du_{non}}{dw} \times \alpha\varepsilon$$

After the weights of the plurality of models have been updated at step 270, the apparatus 100 returns the process to step 230, and repeats the processes up to the judgment concerning whether it is necessary to update the weights of the plurality of models at step 250.

In a case where it has been judged that it is not necessary to update the weights of the plurality of models at step 250, the apparatus 100 groups the words at step 280. For example, the word dictionary storage section 170 creates the word dictionary by grouping a plurality of candidate words output at step 240, immediately before it was judged that it is not necessary to update the weights at step 250, in the same group as the seed word. That is, the apparatus 100 groups a plurality of candidate words output based on the weighted sum of the similarity scores calculated with updated weights of the plurality of models. As an example, the word dictionary storage section 170 stores "yogurt, soybeans, almond, milk" as the word dictionary of "healthy foods" intended by the user.

At step 290, the apparatus 100 judges whether there is another seed word. If it is judged at step 290 that there is another seed word, the process returns to step 220 and the processes up to judging that there is not another seed word at step 290 are repeated. If it is judged that there is not another seed word at step 290, the apparatus 100 ends the processing.

Figure 3:
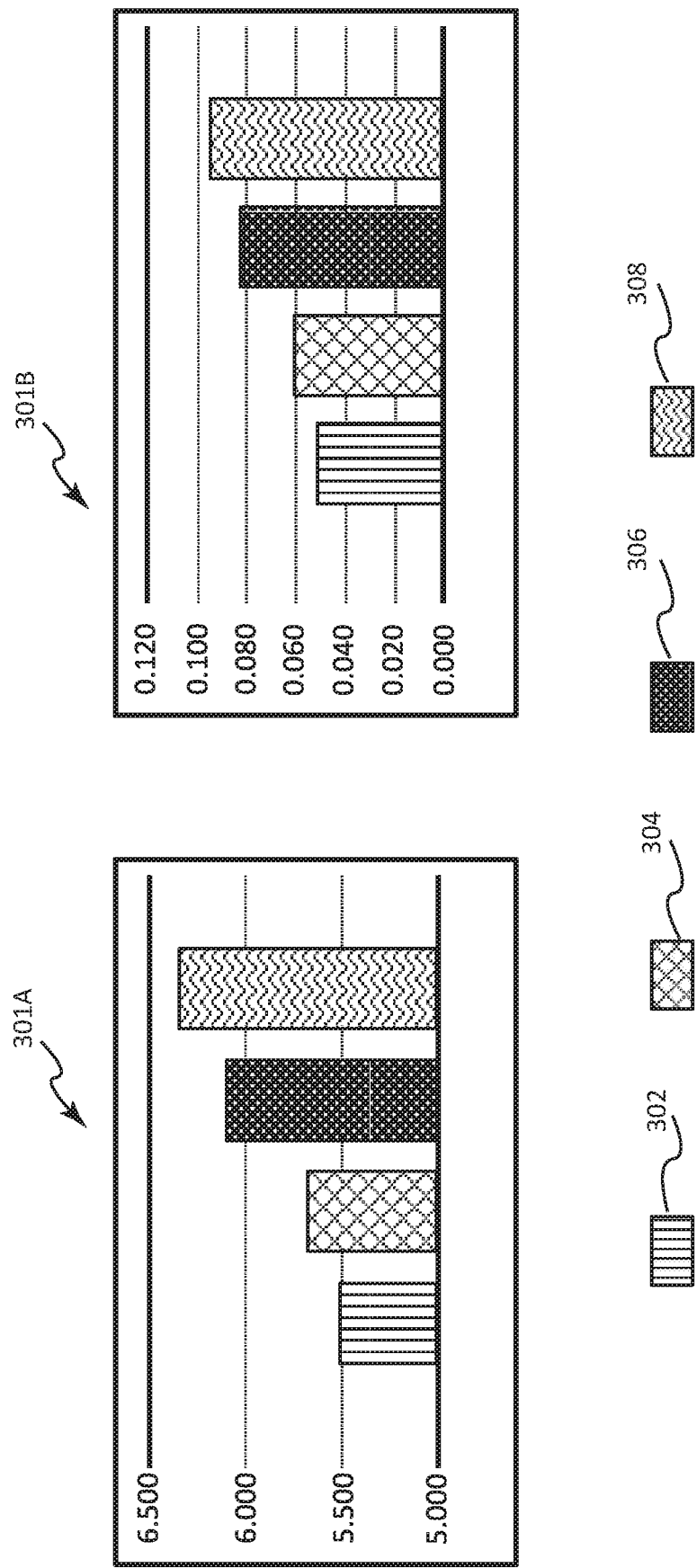
FIG. 3 shows an example of experimental results in a case where the process flow is performed using the apparatus 100 according to the present embodiment.

FIG. 3 shows an example of experimental results 300 in a case where the process flow is performed using the apparatus 100 according to the present embodiment. In the present embodiment, experimental results 300 of four examples are shown, including a first comparative example 302 in which the weights of each of the plurality of models are uniform, a second comparative example 304 in which the weights of each of the plurality of models are heuristic, a first embodiment example 306 in which the weights of each of the plurality of models are learned from only the preferred words, and a second embodiment example 308 in which the weights of each of the plurality of models are learned from both the preferred words and the non-preferred words. In the first graph 301A, the vertical axis shows the number of preferred words that were able to be newly acquired. Furthermore, in the second graph 301B, the vertical axis indicates an evaluation value calculated to have a higher value for preferred words that are ranked higher. In both graphs 301A and 301B, the embodiment examples 306 and 308 according to the present embodiment are able to obtain better results than the comparative examples 302 and 304. Accordingly, it is understood that it is possible to accurately judge the similarity between words and to create the word dictionary intended by the user, by learning the weights of each of the plurality of models based on the annotations. Furthermore, the second embodiment example 308 can obtain even better results than the first embodiment example 306. Accordingly, it is understood that when learning the weights of each of the plurality of models, it is possible to more efficiently and more accurately learn the weights of each of the plurality of models by using the non-preferred words in addition to the preferred words.

In this way, according to the apparatus 100 of the present embodiment, the weights of each of the plurality of models are consecutively learned based on the annotations indicating at least one of preferred words and non-preferred words among the plurality of candidate words. Therefore, when creating the word dictionary by grouping the plurality of words that align with the intent of the user, it is possible to accurately judge the similarity between the words. Furthermore, according to the apparatus 100 of the present embodiment, the weights of each of the plurality of models are updated in a manner to increase the smallest weighted sum of the similarity scores, among the weighted sums of the similarity scores of the plurality of preferred words. In this way, the apparatus 100 can raise up the weighted sums of the similarity scores of all of the preferred words. Furthermore, in general, in contrast to the preferred word group, the words in the non-preferred word group are not necessarily related to the seed word. Therefore, the apparatus 100 according to the present embodiment updates the weights of each of the plurality of models in a manner to decrease randomly selected weighted sums of the similarity scores, among the weighted sums of the similarity scores of the plurality of non-preferred words. In this way, the apparatus 100 can lower the weighted sums of the similarity scores of the non-preferred words evenly. By updating the weights of the plurality of models as described above, the apparatus 100 can judge the similarity between words more accurately and create the word dictionary intended by the user more accurately.

Various embodiments of the present invention can be described with reference to flowcharts and block diagrams whose blocks can represent (1) steps of processes in which operations are performed or (2) sections of apparatuses responsible for performing operations. Certain steps and sections can be implemented by dedicated circuitry, programmable circuitry supplied with computer-readable instructions stored on computer-readable media, and/or processors supplied with computer-readable instructions stored on computer-readable media. Dedicated circuitry can include digital and/or analog hardware circuits and can include integrated circuits (IC) and/or discrete circuits. Programmable circuitry can include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Figure 4:
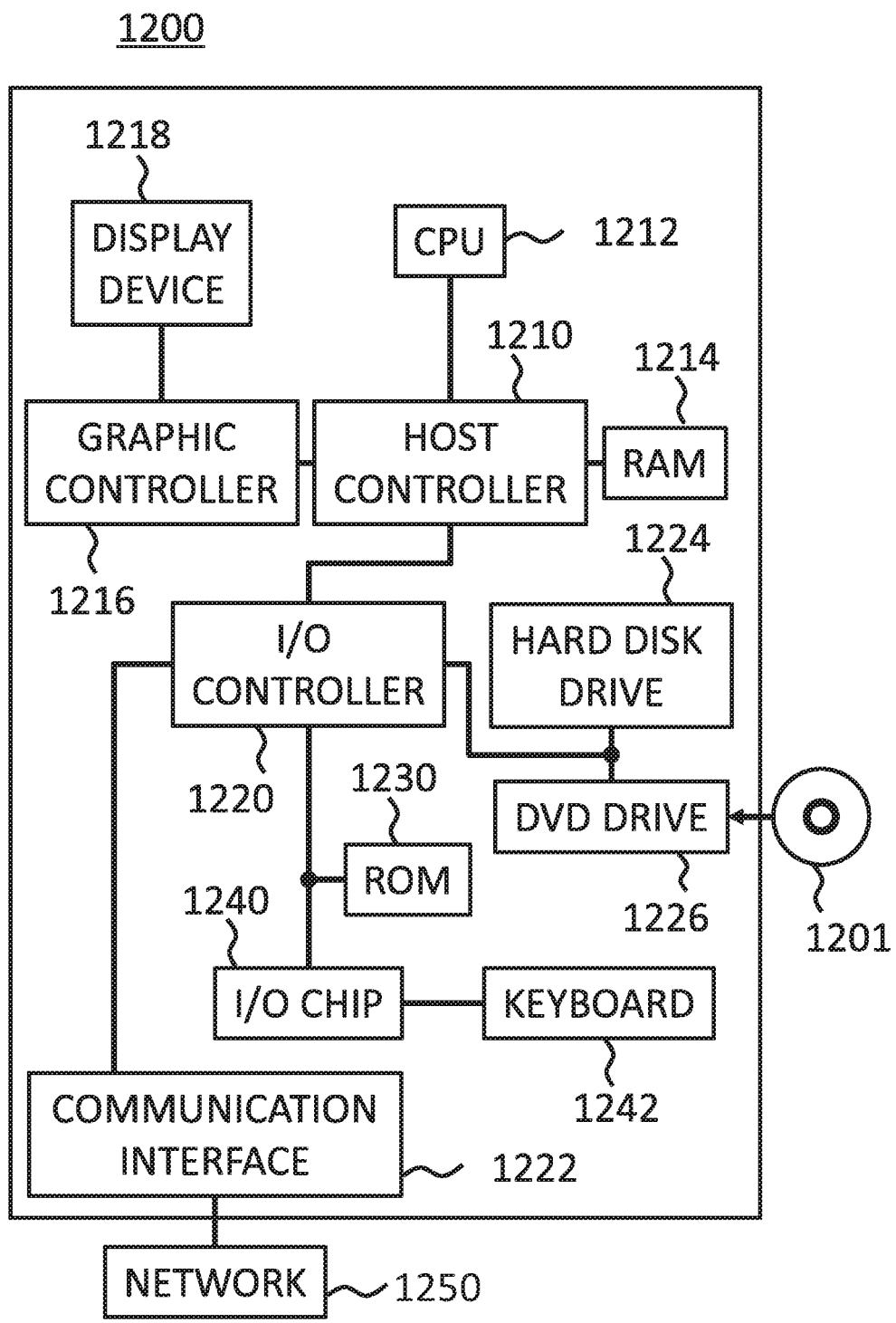
FIG. 4 shows an exemplary hardware configuration of a computer configured to perform the foregoing operations, according to an embodiment of the present invention.

FIG. 4 shows an exemplary hardware configuration of a computer configured to perform the foregoing operations, according to an embodiment of the present invention. A program that is installed in the computer 1200 can cause the computer 1200 to function as or perform operations associated with apparatuses of the embodiments of the present invention or one or more sections (including modules, components, elements, etc.) thereof, and/or cause the computer 1200 to perform processes of the embodiments of the present invention or steps thereof. Such a program can be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network 1250. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 can also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method can be constituted by realizing the operation or processing of information in accordance with the usage of the computer 1200.

For example, when communication is performed between the computer 1200 and an external device, the CPU 1212 can execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to network 1250 or writes reception data received from network 1250 to a reception buffering region or the like provided on the recording medium.

In addition, the CPU 1212 can cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 can then write back the processed data to the external recording medium.

Various types of information, such as various types of programs, data, tables, and databases, can be stored in the recording medium to undergo information processing. The CPU 1212 can perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 can search for information in a file, a database, etc., in the recording medium. For example, when a plurality of entries, each having an attribute value of a first attribute is associated with an attribute value of a second attribute, are stored in the recording medium, the CPU 1212 can search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules can be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
    acquiring a seed word;
    calculating a similarity score of each of a plurality of words relative to the seed word for each of a plurality of models to calculate a weighted sum of the similarity scores for each of the plurality of words;
    outputting a plurality of candidate words among the plurality of words;
    acquiring annotations indicating one or more preferred words among the plurality of candidate words;
    updating weights of the plurality of models in a manner to cause weighted sums of similarity scores for the preferred words to be relatively larger than weighted sums of similarity scores for non-annotated words, the non-annotated words being non-preferred words; and
    grouping the plurality of candidate words output based on the weighted sum of similarity scores calculated with updated weights of the plurality of models.

2. The computer-implemented method of claim 1, wherein the plurality of models extract different feature quantities.

3. The computer-implemented method of claim 2, wherein calculating the similarity scores includes using a weighted average of cosine similarities of the plurality of models to calculate, the weighted sum of the similarity scores.

4. The computer-implemented method of claim 3, wherein the weighted average of the cosine similarities is calculated using a function in which a total weight of the plurality of models is normalized to become a constant value.

5. The computer-Implemented method of claim 1, wherein updating weights of the plurality of models includes updating the weights of the plurality of models in a manner to increase a smallest weighted sum of the similarity scores, among the weighted sums of the similarity scores of the plurality of preferred words.

6. The computer-implemented method of claim 1, wherein updating weights of the plurality of models includes updating the weights of the plurality of models in a manner to decrease a randomly selected weighted sum of the similarity scores, among the weighted sums of the similarity scores of the plurality of non-preferred words.

7. The computer-implemented method of claim 1, wherein outputting a plurality of candidate words includes outputting the plurality of candidate words in order of magnitude of the weighted sums of the similarity scores.

8. The computer-implemented method of claim 1, wherein acquiring annotations includes treating candidate words that are not indicated as being the preferred words, among the plurality of candidate words, as the non-preferred words.

9. An apparatus comprising:
a processor or a programmable circuitry; and
one or more computer readable mediums collectively including instructions that, in response to being executed by the processor or the programmable circuitry, cause the processor or the programmable circuitry to:
acquire a seed word;
calculate a similarity score of each of a plurality of words relative to the seed word for each of a plurality of models to calculate a weighted sum of the similarity scores for each of the plurality of words;
output a plurality of candidate words among the plurality of words;
acquire annotations indicating one or more preferred words among the plurality of candidate words;
update weights of the plurality of models in a manner to cause weighted sums of similarity scores for the preferred words to be relatively larger than weighted sums of the similarity scores for non-annotated words, the non-annotated words being non-preferred words; and
group the plurality of candidate words output based on the weighted sum of similarity scores calculated with updated weights of the plurality of models.

10. The apparatus of claim 9, wherein the plurality of models extract different feature quantities.

11. The apparatus of claim 9, wherein updating weights of the plurality of models includes updating the weights of the plurality of models in a manner to increase a smallest weighted sum of the similarity scores, among the weighted sums of the similarity scores of the plurality of preferred words.

12. The apparatus of claim 9, wherein updating weights of the plurality of models includes updating the weights of the plurality of models in a manner to decrease a randomly selected weighted sum of the similarity scores, among the weighted sums of the similarity scores of the plurality of non-preferred words.

13. A computer program product including one or more computer readable storage mediums collectively storing program instructions that are executable by a processor or programmable circuitry to cause the processor or the programmable circuitry to perform operations comprising:
acquiring a seed word;
calculating a similarity core of each of a plurality of words relative to the seed word for each of a plurality of models to calculate a weighted sum of the similarity scores for each of the plurality of words;
outputting a plurality of candidate words among the plurality of words;
acquiring annotations indicating one or more preferred words among the plurality of candidate words;
updating weights of the plurality of models in a manner to cause weighted sums of similarity scores for the preferred to be relatively larger than weighted sums of similarity scores for non-annotated words, the non-annotated words being non-preferred words; and
grouping the plurality of candidate words output based on the weighted of similarity scores calculated with updated weights of the plurality of models.

14. The computer program product of claim 13, wherein the plurality of models extract different feature quantities.

15. The computer program product of claim 13, wherein updating weights of the plurality of models includes updating the weights of the plurality of models in a manner to increase a smallest weighted sum of the similarity scores, among the weighted sums of the similarity scores of the plurality of preferred words.

16. The computer program product of claim 13, wherein the updating weights of the plurality of models includes updating the weights of the plurality of models in a manner to decrease a randomly selected weighted sum of the similarity scores, among the weighted sums of the similarity scores of the plurality of non-preferred words.

* * * * *